US012737617B2

(12) United States Patent
Tian et al.

(10) Patent No.: US 12,737,617 B2
(45) Date of Patent: Sep. 15, 2026

(54) METHOD FOR SELF-ADAPTIVE SERVICE FUNCTION CHAIN MAPPING BASED ON DEEP REINFORCEMENT LEARNING

(71) Applicant: Zhengzhou University of Light Industry, Zhengzhou (CN)

(72) Inventors: Erlin Tian, Zhengzhou (CN); Wanwei Huang, Zhengzhou (CN); Jing Cheng, Zhengzhou (CN); Zuhe Li, Zhengzhou (CN); Xiao Zhang, Zhengzhou (CN); Weide Liang, Zhengzhou (CN); Song Li, Zhengzhou (CN)

( * ) Notice: Subject to any disclaimer, the term of this patent is extended or adjusted under 35 U.S.C. 154(b) by 1032 days.

(21) Appl. No.: 17/947,175

(22) Filed: Sep. 19, 2022

(65) Prior Publication Data

US 2023/0376748 A1 Nov. 23, 2023

(30) Foreign Application Priority Data

May 23, 2022 (CN) ......................... 202210562305.6

(51) Int. Cl.
*G06N 3/08* (2023.01)

(52) U.S. Cl.
CPC ..................................... *G06N 3/08* (2013.01)

(58) Field of Classification Search
CPC ........................................................ G06N 3/08
See application file for complete search history.

(56) References Cited

U.S. PATENT DOCUMENTS

2003/0119516 A1* 6/2003 Tomishima ............... H04L 1/20 455/445
2005/0089037 A1* 4/2005 Kojima ............... H04L 49/3054 370/394

OTHER PUBLICATIONS

Xu, S., Li, Y., Guo, S., Lei, C., Liu, D., & Qiu, X. (2021). Cloud-edge collaborative SFC mapping for industrial IoT using deep reinforcement learning. IEEE Transactions on Industrial Informatics, 18(6), 4158-4168. (Year: 2021).*

Jia, J., Yang, L., & Cao, J. (May 2021). Reliability-aware dynamic service chain scheduling in 5G networks based on reinforcement learning. In IEEE Infocom 2021—IEEE Conference on Computer Communications (pp. 1-10). IEEE. (Year: 2021).*

(Continued)

*Primary Examiner* — Kavita Stanley

(57) ABSTRACT

A method for a self-adaptive service function chain mapping based on a deep reinforcement learning, comprising: establishing an SFC mapping model, dividing an SFC mapping process into a three-layer structure, and representing the structure with abstract parameters; building an SFCR mapping learning neural network, and mapping the abstract parameters to a state, an action and a reward value in the SFCR mapping learning neural network; establishing an empirical playback pool and updating network parameters; summarizing request rates and utilization rates of different VNFs, a number of currently deployed VNFs and a number of unactivated VNFs based on data in the empirical playback pool; and designing a VNF redeployment strategy, and redeploying the VNFs according to the summarized data. The method has good self-adaptability, and can improve the effective service cost rate and the request mapping rate for processing service requests from users in different time periods.

11 Claims, 5 Drawing Sheets

(56) References Cited

OTHER PUBLICATIONS

Tastevin, N., Obadia, M., & Bouet, M. (May 2017). A graph approach to placement of service functions chains. In 2017 IFIP/IEEE Symposium on Integrated Network and Service Management (IM) (pp. 134-141). IEEE. (Year: 2017).*

You, C. (May 2019). Efficient load balancing for the VNF deployment with placement constraints. In ICC 2019-2019 IEEE International Conference on Communications (ICC) (pp. 1-6). IEEE. (Year: 2019).*

Mouaci, A., Gourdin, É., LjubiĆ, I., & Perrot, N. (Jun. 2020). Virtual network functions placement and routing problem: Path formulation. In 2020 IFIP Networking Conference (Networking) (pp. 55-63). IEEE. (Year: 2020).*

Lillicrap, T. P., Hunt, J. J., Pritzel, A., Heess, N., Erez, T., Tassa, Y., . . . & Wierstra, D. (2015). Continuous control with deep reinforcement learning. arXiv preprint arXiv:1509.02971. (Year: 2015).*

Wolf, "Null in Python: Understanding Python's NoneType Object". (2020), RealPython (Year: 2020).*

Li, W., Wu, H., Jiang, C., Jia, P., Li, N., & Lin, P. (Jun. 2020). Service chain mapping algorithm based on reinforcement learning. In 2020 International Wireless Communications and Mobile Computing (IWCMC) (pp. 800-805). IEEE. (Year: 2020).*

Fan, J., Wang, Z., Xie, Y., & Yang, Z. (Jul. 2020). A theoretical analysis of deep Q-learning. In Learning for dynamics and control (pp. 486-489). PMLR. (Year: 2020).*

* cited by examiner

METHOD FOR SELF-ADAPTIVE SERVICE FUNCTION CHAIN MAPPING BASED ON DEEP REINFORCEMENT LEARNING

CROSS REFERENCE TO THE RELATED APPLICATION

The present application is based upon and claims priority to Chinese Patent Application No. 202210562305.6, filed on May 23, 2022, the entire content of which is hereby incorporated by reference.

TECHNICAL FIELD

The present invention relates to the technical field of service function chain mapping, and in particular to a method for self-adaptive service function chain mapping based on deep reinforcement learning.

BACKGROUND

In recent years, with the explosive growth of network users and the increasingly diversified network service demands, a rigid deployment system in which network functions need to be run by dedicated equipment in a conventional network architecture mode faces a great challenge. Especially in a data center, when a huge and complex network architecture mode faces flexible business requirements of users, resources are not allocated uniformly, which causes a decrease in the quality of service of business. Network function virtualization (NFV) techniques provide a more flexible and efficient response mode for service requests of users to solve the problem of rigid deployment of network functions. By NFV, a virtualization technology is used to convert network function software into a virtual network function (VNF) which is deployed on a general hardware platform in a virtual network function instance (VNFI) manner, such that the flexibility and expandability of network function deployment are greatly improved, and the hardware investment cost and operation and maintenance cost of network operators are reduced. In the NFV, a user initiates a service request to a network service provider, and a network service data flow sequentially passes through a series of VNFs from a source node to a destination node in a specific order. Such a chained service request is referred to as service function chain (SFC), and the network service request initiated by the user is referred to as service function chain request (SFCR). SFC technology promotes the construction of a highly extensible network business flow processing platform, and improves the speed and flexibility of processing business requests from users. However, the existing SFC mapping method does not take the unsuitability of the existing VNF for current network business requirements of a user over time into consideration, which causes the problems of waste of idle resources, low user request mapping rate and the like. Therefore, a mapping optimization method needs to be established. Based on the fact that an existing physical network topology structure is unchangeable, the VNF is redeployed by improving a deep reinforcement learning framework and collecting historical mapping data, such that the VNF can be more scientifically deployed in the physical network topology to meet service requests of users in different time periods, improve the user request mapping rate and reduce the mapping cost.

SUMMARY

For technical problems such as a difference in demands for deployed VNFs in a static network environment due to the fact that the intensity of demands of users for services changes over time, leading to an untimely response to a service request in a service node with a higher demand and a long idle period of a service node with a lower demand, which increases unnecessary service cost, the present invention provides a method for self-adaptive service function chain mapping based on deep reinforcement learning. VNFs are redeployed in a basic physical network to improve the self-adaptivity of the VNFs to service requests, thus improving the effective service cost rate and the mapping rate.

In order to achieve the above purpose, the technical scheme of the present invention is implemented as follows: Provided is a method for self-adaptive service function chain mapping based on deep reinforcement learning, comprising:

- step I: establishing a service function chain (SFC) mapping model, dividing an SFC mapping process into a three-layer structure comprising a network function service request set, a request mapping layer and a basic physical network, and representing the three-layer structure with abstract parameters;
- step II: building an service function chain request (SFCR) mapping learning neural network, initializing parameters of the SFCR mapping learning neural network, and mapping the abstract parameters in the step I to a state, an action and a reward value involved in the SFCR mapping learning neural network;
- step III: establishing an empirical playback pool and updating network parameters of the SFCR mapping learning neural network;
- step IV: determining whether a current time slot t meets a redeployment requirement, and if not, proceeding to the step III, or otherwise, proceeding to step V;
- step V: summarizing request rates and utilization rates of different virtual network functions (VNFs), a number of currently deployed VNFs and a number of unactivated VNFs based on historical SFCR mapping data stored in the empirical playback pool; and
- step VI: designing a VNF redeployment strategy, and redeploying the VNFs in the basic physical network according to the data summarized in the step V.

In the step I, representing the network function service request set, the request mapping layer and the basic physical network topology with abstract parameters comprises:

abstracting the network function service request set into $SRs=\{SCFR_1, SCFR_2, SCFR_3 \ldots\}$, wherein $SCFR_1$, $SCFR_2$ and $SCFR_3$ respectively represent the first, the second and the third SFCRs in the set SRs; and representing the $f^{th}$ service function chain request $SFCR_f$ with a directed weighted graph $SR^f=(V^f, E^f, d^f)$, wherein a virtual network function node set is $$V^f = \{v_1^f, v_2^f \ldots v_l^f\},$$

$$v_1^f$$

represents a source node of the directed weighted graph $SR^f$, $$v_l^f$$

represents a destination node of the directed weighted graph $SR^f$, l represents a number of network functions required by the service function chain request $SFCR_f$, and $$v_2^f$$

is a middle virtual network function node; virtual links $$e_{i,j}^f$$

between a virtual network function node $$v_i^f$$

and a virtual network function node $$v_j^f$$

consist of a virtual link set $$E^f = \{e_{i,j}^f \mid i, j \le l\};$$

$d^f$ represents that the time of a service node resource and a bandwidth resource occupied by the service function chain request $SFCR_f$ is d; a central processing unit (CPU) resource required by normal running of the virtual network function node $$v_i^f$$

is $$vC(v_i^f),$$

an internal memory resource demand is $$vM(v_i^f),$$

and a bandwidth resource required by each virtual link $$e_{i,j}^f$$

is $$vB(e_{i,j}^f);$$

abstracting the basic physical network into a weighted undirected graph G={N, L} representation, wherein $N=\{n_1, n_2 \ldots n_m\}$ represents a set of physical service nodes $n_1, n_2 \ldots n_m$, m is a total number of the physical service nodes, $L=\{l_{a,b}|a,b\le m\}$ is a physical link set, and $l_{a,b}$ represents physical links between two physical service nodes $n_a$ and $n_b$; various virtual network function instances (VNFIs) can be deployed on each physical service node, and a VNFI set of the physical service nodes $n_a$ is denoted by $VNFIs^a=\{VNF_x, p|p=0,1\}$; p=0 indicates that the $x^{th}$ VNF is not activated, and p=1 indicates the $x^{th}$ VNF is activated; x is in a range of 0 to k, and k represents the type of a VNF; a current remaining CPU resource of the physical service node $n_a$ is $C(n_a)$, an internal memory resource is $M(n_a)$, a bandwidth resource of a physical link $l_{a,b}$ of the physical service nodes $n_a$ and $n_b$ is $B(l_{a,b})$; and abstracting the request mapping layer into an undirected graph $G^M=(V^f, N, vE)$, wherein the undirected graph $G^M$ represents a mapping topology graph of an SFCR in the basic physical network, $V^f$ is a set of virtual network function nodes of the $f^{th}$ service function chain request $SFCR_f$, N is a physical network service node set, and $$vE = \left\{M_{v_i^f, n_j}\right\}$$

represents a mapping link between the $i^{th}$ virtual network function node $$v_i^f$$

and the $j^{th}$ virtual network function node $n_j$ in the $f^{th}$ service function chain request $SFCR_f$.

In the virtual network function node set $V^f$, an order of middle virtual network function nodes $$v_2^f \ \ldots \ v_{l-1}^f$$

is an order where SFC network flows or business flow pass through the network functions.

In the step II, initializing parameters of the SFCR mapping learning neural network comprises: initializing a mapping learning framework: setting the mapping topology graph $G^M$ to null, initializing the empirical playback pool to null, randomly initializing a current strategy network parameter Bid and a current value network parameter $\theta^Q$, and respectively copying the current strategy network parameter and the current value network parameter to a target strategy network parameter $\theta^{\mu'}$ and a target value network parameter $\theta^{Q'}$.

In the step II, mapping the abstract parameters to the SFCR mapping learning neural network comprises:

including a network state G(t) of a physical service node in the basic physical network and a network function service request set SRs(t) at the current time slot t in each state $s_t=\{G(t), SRs(t)\}$ in a state space $S(t)=\{s_1, s_2 \ldots s_t\}$, wherein the state $s_t$ is an input of the SFCR mapping learning neural network;

obtaining a mapping action $\alpha_t=\mu(s_t|\theta^\mu)$ taken under each state $s_t$ according to an action strategy function to form an action space $A(t)=\{a_1, a_2 \ldots a_t\}$, wherein $\mu(\ )$ represents an action selection strategy, the mapping action is $a_t=\{a_v, a_m, a_s\}$, $a_v$ is a mapping action between a VNF and a physical service node, $a_m$ is a mapping between a virtual link and a physical link, and $a_s$ is a VNF activation and dormancy action; updating the mapping topology graph $G^M \leftarrow (G^M, a_t)$ based on the state of the mapping topology graph $G^M$ and a current mapping action $a_t$, and updating the network state G(t) of the physical service node and the network service function request set SRs(t) according to the updated mapping topology graph $G^M$ to obtain a next state $s_{t+1}$; and generating an instant return $r(s_t, a_t)$ by each action, wherein reward values $r_t$ of the instant return form a reward space $R(t)=\{r_1, r_2 \ldots r_t\}$.

The instant return is $r(s_t, a_t)=\alpha_1 Ur(t)+\alpha_2 avgM(t)$, weights $\alpha_1, \alpha_2 \in [0,1]$, and Ur(t) and avgM (t) are respectively an effective service cost rate and an average mapping rate within the current time slot t.

The effective service cost rate is $$Ur(t) = \frac{\sum_{VNFI \in G^M, x=1} Cr(t)}{Co(t)},$$

and the average mapping rate is $$avgM(t) = \frac{Sum(SRs(t) \mid G^M(t))}{Sum(SRs(t))};$$

wherein the total service cost Co(t)=Cr(t)+Ca(t)+Cs(t) is a sum of a total running cost Cr(t), a total activation cost Ca(t) and a total installation cost Cs(t);

the total running cost Cr(t) is $$Cr(t) = \sum_{i=1}^{m} VNFIs^i\{VNF_x^i, p \mid p=1\} \times r(VNF_x), x \le k;$$

the total activation cost Ca(t) is:

$$Ca(t) = \sum_{i=1}^{m} (\{VNFIs^i(t), p \mid p=1\} - \{VNFIs^i(t-1), p \mid p=0\}) \times a(VNF_x), x \le k;$$

the total installation cost Cs(t) is:

$$Cs(t) = \sum_{i=1}^{m} (\{VNFIs^i(t) \mid VNF_x\} - \{VNFIs^i(t-1) \mid VNF_x\}) \times s(VNF_x), x \le k;$$

wherein m represents a number of physical service nodes, $VNFIs^i$ represents a VNFI set on the $i^{th}$ physical service node, $$VNF_x^i$$

represents the $x^{th}$ VNF in the $i^{th}$ VNFI set, k represents a total number of VNF types, and $r(VNF_x)$ represents the running cost of the $x^{th}$ VNF; $\{VNFIs_i(t), p \mid p=1\}$ represents a VNF in an activated state at the time slot t, $\{VNFIs^i(t-1), p \mid p=0\}$ represents a VNF that is not activated at the time slot t−1, and a(VNF) represents the activation cost of the $x^{th}$ VNF; $\{VNFIs^i(t) \mid VNF_x\}$ represents a deployment condition of the $x^{th}$ VNF at the time slot t, $\{VNFIs^i(t-1) \mid VNF_x\}$ represents a deployment condition of the $x^{th}$ VNF at the time slot t−1, and $s(VNF_x)$ represents an installation cost of the $x^{th}$ VNF.

An implementation method of the step III comprises: storing an acquired state $s_t$, an action $a_t$, a reward value $r_t$ and a next state $s_{t+1}$ into the empirical playback pool in a form of quad $<s_t, a_t, r_t, s_{t+1}>$; updating network parameters comprises: putting the current state $s_i$ and action $a_i$ into a current value network to obtain $Q_i=Q(s_i, \mu(s_i|\theta^\mu)\theta^Q)$, wherein $\theta^\mu$ is a current strategy network parameter, $\theta^Q$ is a current value network parameter, and Q( ) represents an action value function; randomly sampling W time period vectors from the empirical playback pool, and sending the time period vectors into a target value network for training to obtain a target value $Q'_{i+1}=Q(s_{i+1}, \mu'(s_i|\theta^{\mu'})|\theta^{Q'})$, wherein $\theta^{\mu'}$ is a target strategy network parameter, and $\theta^{Q'}$ is a target value network parameter; calculating a target return $$y_i = r_i + \gamma Q'_{i+1};$$

finally, updating the current strategy network parameter $\theta^\mu$ and the current value network parameter $\theta^Q$ through the target return and a variance $Loss=1/N \times \Sigma_i (y_i - Q_i)^2$ of an actual value $Q_i$; and updating the target strategy network parameter $\theta^{\mu'}$ and the target value network $\theta^{Q'}$ of the target strategy network A' and the target value network Q' by setting a soft update coefficient $\tau$ and using a soft update algorithm: $\theta'=\tau\theta'+(1-\tau)\theta'$.

The step V comprises summarizing the SFCR mapping vectors sampled from the empirical playback pool in previous W time periods to obtain a quad $\{s_t, a_t, r_t, s_{t+1}\}$, wherein $s_t$, $s_{t+1}$ respectively represent states at the time slots t and t+1; $a_t$ is an action, and $r_t$ is a reward value;

initializing parameter arrays to be summarized to null: Res=(0, 0, 0 . . . ), Uses=(0, 0, 0 . . . ), Va=(0, 0, 0 . . . ) and Slp=(0, 0, 0 . . . );

traversing the sampled mapping vector groups of the previous W time periods, recording a currently traversed period number using a parameter t, summarizing statistical data corresponding to various VNFs, recording the current traversed VNFs using parameter x, thus obtaining a request rate:

$$Res(x) = \frac{Sum(SRs(t), VNF_x)}{Sum(SRs(t))} \times 100\%, x \le k;$$

the utilization rate is:

$$Uses(x) = \frac{Sum(G^M(t), VNF_x)}{Sum(SRs(t))} \times 100\%, x \le k;$$

the number of the currently deployed VNFs is: $Va(x)=Sum(SRs(t)|VNF_x, p=0)+Sum(SRs(t)|VNF, p=1), x \le k$;

the number of unactivated VNFs is: $Slp(x)=Sum(SRs(t)|VNF_x, p=0), x \le k$;

wherein, $Sum(SRs(t),VNF_x)$ represents a sum of request numbers for the $x^{th}$ VNF at the time slot t from the network service function request set SRs(t), and k is the total number of VNF types; Sum(SRs(t)) represents a sum of request numbers for all the VNFs in the network service function request set SRs(t) at the time slot t; $Sum(G^M(t), VNF_x)$ represents a sum of mapping numbers of the $x^{th}$ VNF in the service mapping topology graph $G^M(t)$ at the time slot t; $Sum(SRs(t)|VNF_x, p=0)$ represents a sum of numbers of dormancy states of the $x^{th}$ VNF at the time slot t, and $Sum(SRs(t)|VNF_x, p=1)$ represents a sum of numbers of activated states of the $x^{th}$ VNF at the time slot t;

an average of request rates is an average request rate $$AvgRes = \frac{\sum_{x=0}^{k} Res(x)}{k};$$

an average of utilization rates is an average utilization rate $$AvgUses = \frac{\sum_{x=0}^{k} \text{Uses}(x)}{k};$$

an average of numbers of deployed VNFs is an average number $$AvgVa = \frac{\sum_{x=0}^{k} Va(x)}{k}$$

of deployed VNF; and an average of numbers of unactivated VNFs is an average number $$AvgSlp = \frac{\sum_{x=0}^{k} Slp(x)}{k}$$

of unactivated VNFs.

The VNF redeployment strategy in the step VI comprises: (1) uninstalling: if a request rate is less than 70% of the average request rate AvgRes, a utilization rate is less than 70% of the average utilization rate AvgUses, a number of deployed VNFs is greater than 120% of the average number AvgVa of deployed VNFs, and a number of unactivated VNFs is greater than 110% of AvgSlp, uninstalling 10% of unactivated VNFIs; (2) installing: if a request rate is greater than 130% of AvgRes, a utilization rate is greater than 130% of AvgUses, a number of deployed VNFs is less than 80% of AvgVa, and a number of unactivated VNFs is zero, performing an incremental deployment on the VNFIs, wherein the number of deployed VNFs is 10% of the existing number Va(x); (3) activating: if a request rate is greater than 110% of AvgRes, a utilization rate is greater than 110% of AvgUses, and there are unactivated VNFIs, activating 10% of sleeping VNFIs; and (4) sleeping: if a request rate is less than 90% of AvgRes, a utilization rate is less than 90% of AvgUses, and there are activated VNFIs, making 10% of the activated VNFIs sleeping.

Compared with the prior art, the present invention has the beneficial effects:

(1) The present invention has advantages in maintaining the stability of a network environment and improving the quality of service for a user, and can effectively solve the problems of small proportion of effective service cost and low service mapping efficiency caused by dynamic change over time in the existing mapping method.

(2) The method has good self adaptivity; an improved deep deterministic policy gradient (DDPG) is used as an SFCR mapping learning framework; the effective service cost rate and the request mapping rate are used as optimization targets; historical mapping data is used as a basis; four redeployment strategies are designed to redeploy VNFs, which can improve the effective service cost rate and the request mapping rate for processing user service requests in different time periods; compared with a DDPG algorithm and a deep Q network (DQN) method, the method improves the average effective service cost rate by up to 22.47% and the average mapping rate by up to 15.05%.

BRIEF DESCRIPTION OF THE DRAWINGS

In order to more clearly illustrate the technical solutions in the embodiments of the present invention or in the prior art, the drawings required to be used in the description of the embodiments or the prior art are briefly introduced below. It is obvious that the drawings in the description below are some embodiments of the present invention, and those of ordinary skilled in the art can obtain other drawings according to the drawings provided herein without creative efforts.

DETAILED DESCRIPTION OF THE EMBODIMENTS

The technical schemes in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those skilled in the art without creative effort shall fall within the protection scope of the present invention.

Figure 1:
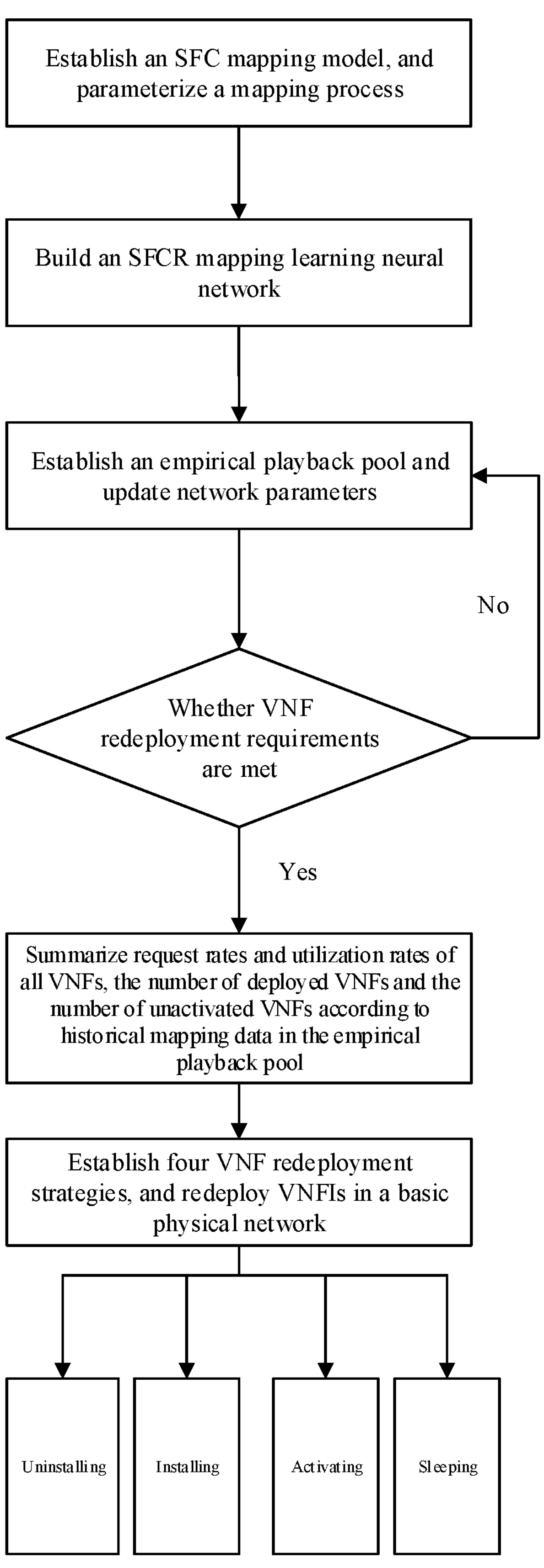
FIG. 1 is a schematic flowchart of the present invention.

In most existing mapping methods, when a state of a network environment is known and fixed, the mapping rate and reliability of network services are effectively improved, but it does not take into account the fact that the existing network environment is not suitable for a demand for network business of a current user due to dynamic changes over time, causing overstock of network business requests, resulting in an excessive network link load and affecting the stability of the network environment. Furthermore, during mapping of SFCs, continuously improving the service request mapping rate ignores the service running and maintenance cost, resulting in high SFC mapping cost. The present invention provides a method for self-adaptive service function chain mapping based on deep reinforcement learning, as shown in FIG. 1, comprising the following specific workflow procedures:

Step I: establishing a service function chain (SFC) mapping model, dividing an SFC mapping process into a three-layer structure comprising a network function service request set, a request mapping layer and a basic physical network topology, and representing the three-layer structure with abstract parameters.

Figure 2:
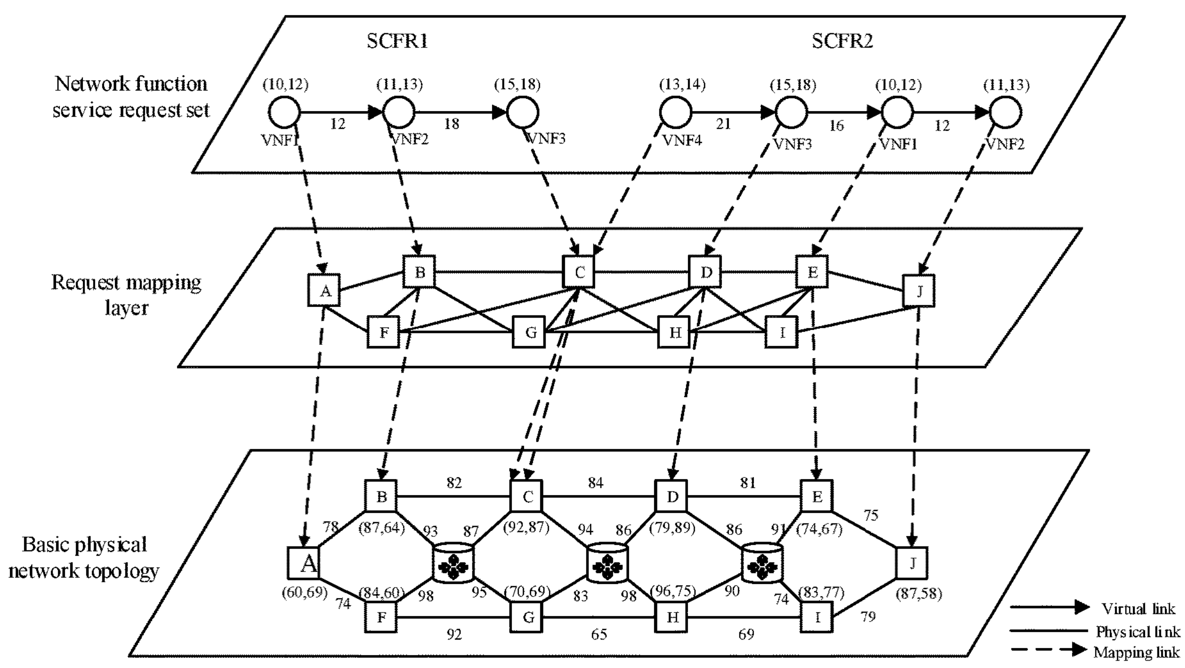
FIG. 2 is a schematic structural diagram of an SFC mapping model of the present invention.
Figure 3A:
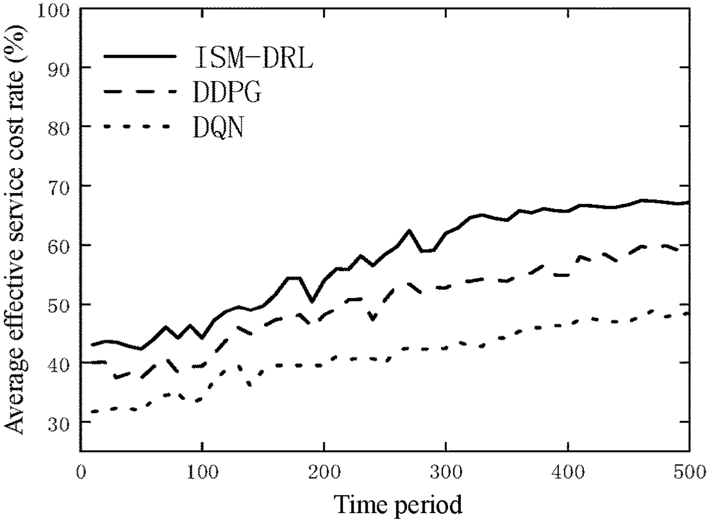
FIG. 3A is a comparison curve of simulated average effective service cost rates, wherein $\alpha_1=0.3$ and $\alpha_2=0.7$.
Figure 3B:
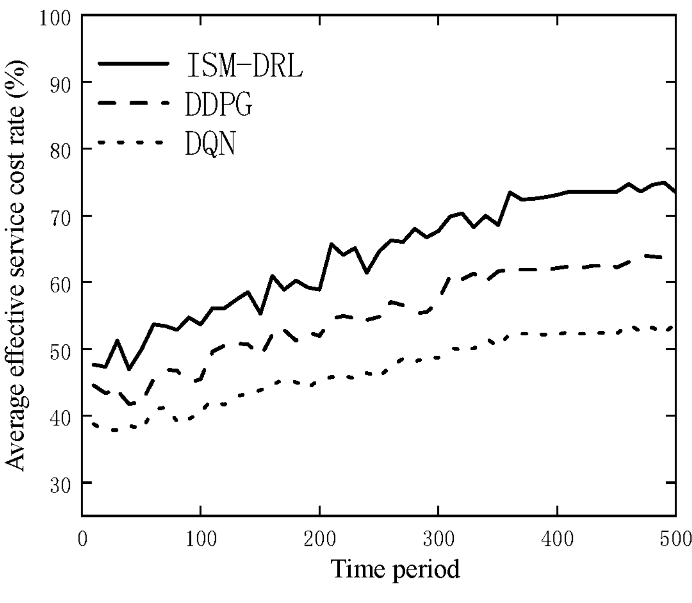
FIG. 3B is a comparison curve of simulated average effective service cost rates, wherein $\alpha_1=0.5$ and $\alpha_2=0.5$.
Figure 3C:
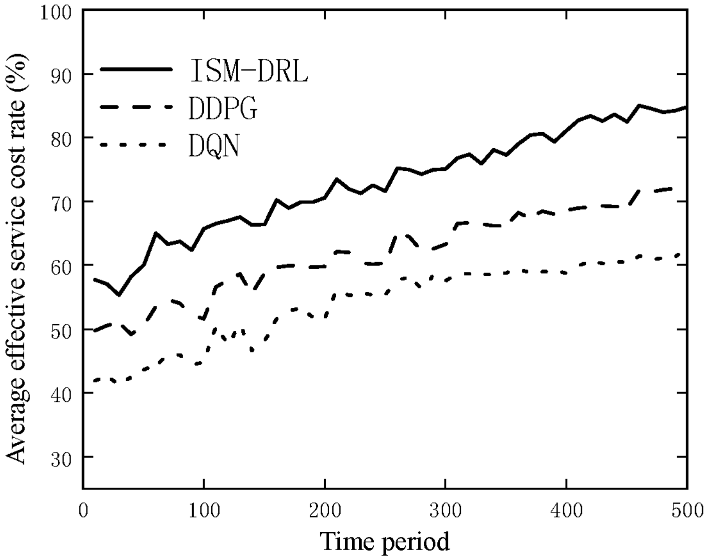
FIG. 3C is a comparison curve of simulated average effective service cost rates, wherein $\alpha_1=0.7$ and $\alpha_2=0.3$.
Figure 4A:
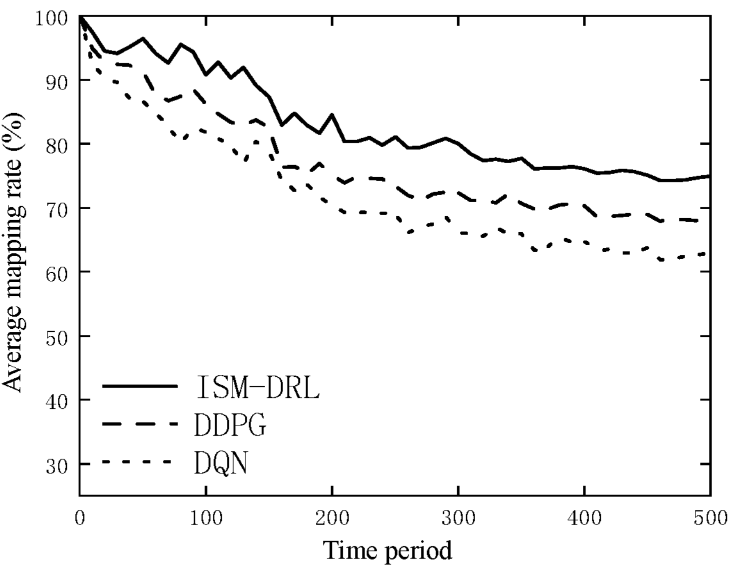
FIG. 4A is a comparison curve of simulated average mapping rates, wherein $\alpha_1=0.3$ and $\alpha_2=0.7$.
Figure 4B:
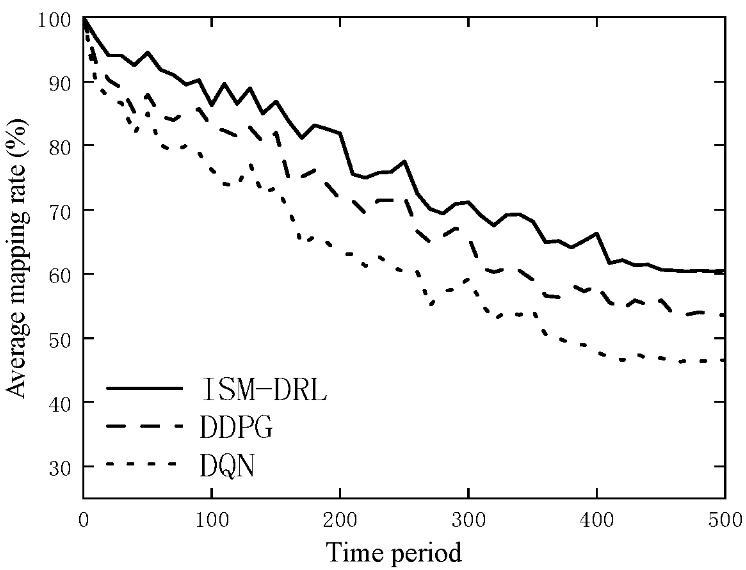
FIG. 4B is a comparison curve of simulated average mapping rates, wherein $\alpha_1=0.5$ and $\alpha_2=0.5$.
Figure 4C:
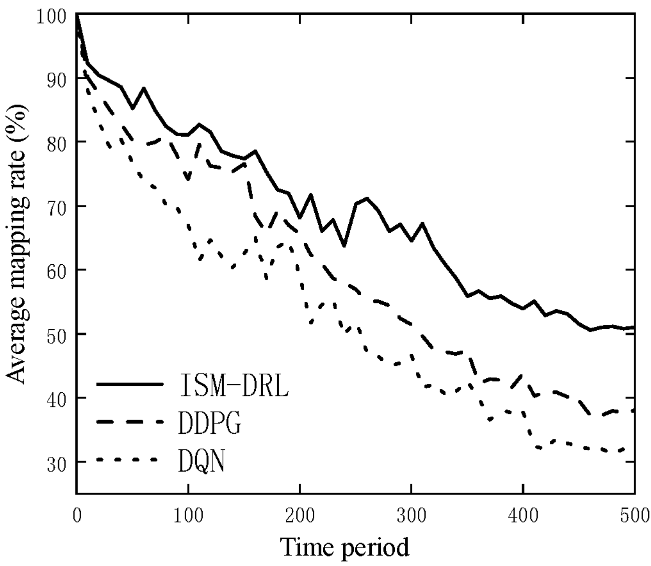
FIG. 4C is a comparison curve of simulated average mapping rates, wherein $\alpha_1=0.7$ and $\alpha_2=0.3$.

The SFC mapping model graph is as shown in FIG. 2, and specific procedures are as follows:

The network function service request set is abstracted into SRs={$SCFR_1$, $SCFR_2$, $SCFR_3$ . . . }, wherein $SCFR_1$, $SCFR_2$ and $SCFR_3$ respectively represent the first, the second and the third SFCRs in the set SRs. Due to uncertainty of user demands, the number of SFCR contained in the service request set SRs may be different. The $f^{th}$ service function chain request $SFCR_f$ is represented with a directed weighted graph $SR^f=(V^f, E^f, d^f)$, wherein $$V^f = \{v_1^f, v_2^f \ldots v_l^f\}$$

represents a virtual network function node set, $$v_1^f$$

represents a source node of the directed weighted graph $SR^f$, $$v_l^f$$

represents a destination node of the directed weighted graph $SR^f$, l represents a number of network functions required by the service function chain request $SFCR_f$, and an order of middle nodes is an order where SFC network flows or business flows pass through network functions; a virtual link set is $$E^f = \{e_{i,j}^f \mid i, j \le l\},$$

wherein $$e_{i,j}^f$$

represents virtual links between virtual network function nodes $$v_i^f \text{ and } v_j^f;$$

$d^f$ represents that the time of a service node resource and a bandwidth resource occupied by the service function chain request $SFCR_f$ is d; a central processing unit (CPU) resource $$vC(v_i^f)$$

and an internal memory resource demand $$vM(v_i^f)$$

required by normal running of each virtual network function node $$v_i^f(v_i^f \in V^f)$$

are represented by $$(vC(v_i^f), vM(v_i^f))$$

and a bandwidth resource required by each virtual link $$e_{i,j}^f(e_{i,j}^f \in E^f)$$

is represented by $$vB(e_{i,j}^f).$$

During subsequent mapping of SFCRs, the nodes and links which satisfy normal running resources are selected for mapping. If there are no nodes and links satisfying normally running resources, the mapping fails.

The basic physical network topology is abstracted to be represented by a weighted undirected graph G={N, L}, wherein N represents a set of physical service nodes $n_1$, $n_2$ . . . $n_m$ which can be represented by N={$n_1$, $n_2$, . . . $n_m$}, m is a total number of physical service nodes, L={$l_{a,b}$|a, b≤m} is a physical link set, and $l_{a,b}$ represents physical links between two physical service nodes $n_a$ and $n_b$. Various virtual network function instances (VNFIs) can be deployed on each physical service node, and a VNFI set of the physical service nodes $n_a$ is denoted by $VNFIs^a$={$VNF_{x,p}$|p=0,1}. p=0 indicates that the $x^{th}$ VNF is not activated, and the network function service cannot be provided. p=1 indicates that the $x^{th}$ VNF is activated, and the network function service can be provided. x is in a range of 0 to k, and k represents the type of a VNF. The current remaining CPU resources and internal memory resources of the physical service node $n_a$ are represented by ($C(n_a)$,$M(n_a)$). The remaining bandwidth resources of the physical link $l_{a,b}$ of the physical service nodes $n_a$ and $n_b$ are represented by $B(l_{a,b})$. During subsequent mapping of SFCRs, the remaining resources of nodes and links will be conditions for determining whether the nodes and links can be mapped. If the remaining resources of a physical node and link are more than resources required by normal running of an SFCR, the SFCR can be mapped to the physical node and link. If the physical node and link do not have resources satisfying the normal running of the SFCR, the SFCR cannot be mapped to the basic physical network, and the mapping fails.

The request mapping layer is abstracted into an undirected graph $G^M=(V^f, N, vE)$ representing a service mapping graph of an SFCR in the basic physical network, wherein $V^f$ is a set of virtual network function nodes of the $f^{th}$ network function service request $SFCR_f$, N is a physical network function service node set, and $vE=\{M_{v_i^f,n_j}\}$ represents a mapping link between the $i^{th}$ virtual network function node $$v_i^f$$

and the $j^{th}$ virtual network function node $n_j$ in the $f^{th}$ network function service request $SFCR_f$.

Step II: building an service function chain request (SFCR) mapping learning neural network, initializing parameters of the SFCR mapping learning neural network, and mapping the abstract parameters in the step I to a state, an action and a reward value involved in the SFCR mapping learning neural network.

Specific procedures are as follows:

Initializing a mapping learning framework: the mapping topology graph $G^M$ is set to null, the empirical playback pool is initialized to null, a current strategy network parameter $\theta^\mu$ and a current value network parameter $\theta^Q$ are randomly initialized, and the current strategy network parameter and the current value network parameter are respectively copied to a target strategy network parameter $\theta^{\mu'}$ and a target value network parameter $\theta^{Q'}$.

In a state space $S(t)=\{s_1, s_2 \ldots s_t\}$, each state is $s_t=\{G(t), SRs(t)\}$, including a network state G(t) of a physical service node in the basic physical network and a network function service request set SRs(t) at the current time slot t, wherein the state $s_t$ is an input in the SFCR mapping learning neural network.

A mapping action $a_t=\mu(s_t|\theta^\mu)$ taken under each state can be obtained according to an action strategy function to form an action space $A(t)=\{a_1, a_2 \ldots a_t\}$, wherein $\mu(\ )$ represents an action selection strategy. The mapping action is $a_t=\{a_v, a_m, a_s\}$, $a_v$ is a mapping action between a VNF and a physical service node in the basic physical network, $a_m$ is mapping between a virtual link and a physical link, and $a_s$ is a VNF activation and dormancy action. The mapping topology graph $G_M \leftarrow (G_M, a_t)$ is updated based on the state of the mapping topology graph $G_M$ and a current mapping action $a_t$, and the network state G(t) of the physical service node and the network service function request set SRs(t) are updated according to the updated mapping topology graph $G_M$ to obtain a next state $s_{t+1}$.

Each action generates an instant return $r(s_t, a_t)$, wherein recorded reward values $r_t$ of the instant return may form a reward space $R(t)=\{r_1, r_2 \ldots r_t\}$. The reward value of the present invention aims at the effective service cost rate and the mapping rate. The instant return is $r(s_t, a_t)=\alpha_1 Ur(t)+\alpha_2 avgM(t)$, $\alpha_1, \alpha_2 \in [0,1]$ and $\alpha_1$, $\alpha_2$ are weights. Larger weights indicate higher emphasis to which item's influence on a final mapping result, wherein Ur(t) and avgM(t) are respectively the effective service cost rate and the average mapping rate within the current time slot t. Calculation processes are shown in formulas (1), (2) and (3):

$$Ur(t) = \frac{\sum_{VNFI \in G^M, x=1} Cr(t)}{Co(t)} \quad (1)$$

-continued $$avgM(t) = \frac{\mathrm{Sum}(Srs(t) \mid G^M(t))}{\mathrm{Sum}(SRs(t))} \quad (2)$$

$$Co(t) = Cr(t) + Ca(t) + Cs(t) \quad (3)$$

Within the time slot t, Ur(t) is dividing the total running cost of the activated VNFs by the total service cost; avgM(t) is dividing the total number of SFCRs by the number of the successfully mapped network function service requests SFCR; the total service cost Co(t) is a sum of the total running cost Cr(t), the total activation cost Ca(t) and the total installation cost Cs(t); and the calculation formulas of the total running cost Cr(t), the total activation cost Ca(t) and the total installation cost Cs(t) are shown in formulas (4), (5) and (6):

$$Cr(t) = \sum_{i=1}^{m} VNFIs^i\{VNF_x^i, p \mid p=1\} \times r(VNF_x), x \le k \quad (4)$$

$$Ca(t) = \sum_{i=1}^{m} (\{VNFIs^i(t), p \mid p=1\} - \{VNFIs^i(t-1), p \mid p=0\}) \times a(VNF_x), x \le k \quad (5)$$

$$Cs(t) = \sum_{i=1}^{m} (\{VNFIs^i(t) \mid VNF_x\} - \{VNFIs^i(t-1) \mid VNF_x\}) \times s(VNF_x), x \le k \quad (6)$$

In the formulas, m represents a number of physical service nodes, $VNFIs^i$ represents a VNFI set on the $i^{th}$ physical service node, $$VNF_x^i$$

represents the $x^{th}$ VNF in the $i^{th}$ VNFI set, k represents a total number of VNF types, and $r(VNF_x)$ represents the running cost of the $x^{th}$ VNF; $\{VNFIs^i(t), p|p=1\}$ represents a VNF in an activated state at the time slot t, $\{VNFIs^i(t-1), p|p=0\}$ represents a VNF that is not activated at the time slot t−1, and $a(VNF_x)$ represents the activation cost of the $x^{th}$ VNF; $\{VNFIs^i(t)|VNF_x\}$ represents a deployment condition of the $x^{th}$ VNF at the time slot t, $\{VNFIs^i(t-1)|VNF_x\}$ represents a deployment condition of the $x^{th}$ VNF at the time slot t−1, and $s(VNF_x)$ represents an installation cost of the $x^{th}$ VNF.

Step III: establishing an empirical playback pool and updating network parameters of the SFCR mapping learning neural network.

Specific procedures are as follows:

The state, action, reward value and next state acquired in the step II are stored into the empirical playback pool in a form of quad $<s_t, a_t, r_t, s_{t+1}>$. When the current network is updated, the current state $s_i$ and action $a_i$ are put into a current value network to obtain an actual value $Q_i=Q(s_i, \mu(s_i|\theta^\mu)|\theta^Q)$, wherein $\theta^\mu$ is a current strategy network parameter, $\theta^Q$ is a current value network parameter, and $Q(\ )$ represents an action value function. W time period vectors are randomly sampled from the empirical playback pool Exp and sent into a target value network for training to obtain a target value $$Q'_{i+1} = Q(s_{i+1}, \mu'(s_i | \theta^{\mu'}) | \theta^{Q'}).$$

A target return $y_i$ is then calculated according to $y_i=r_i+\gamma Q'_{i+1}$. Finally, the mapping parameters $\theta^\mu$ and $\theta^Q$ in the current network are updated according to the target return and a variance $Loss=1|N\times\Sigma_i(y_i-Q_i)^2$ of the actual target value $Q_i$. The mapping parameters $\theta^{\mu'}$ and $\theta^{Q'}$ of the target strategy network and the target value network are updated by setting a soft update coefficient $\tau$ and using a soft update algorithm, which can be represented by $\theta'=\tau\theta'+(1-\tau)\theta'$, wherein the soft update coefficient $\tau$ is usually 0.001.

In addition, VNF redeployment is performed once every 50 time periods. A number of currently traversed periods is recorded using a parameter t. Whether the current time slot t is a fold of 50 is determined. If yes, the step III is executed; otherwise, the step IV is executed.

Step IV: request rates Res and utilization rates Uses of different virtual network functions (VNFs), a number of currently deployed VNFs Va and a number of unactivated VNFs Slp are summarized based on historical SFCR mapping data stored in the empirical playback pool to redeploy the VNFs.

Specific procedures are as follows:

The SFCR mapping vectors within the previous W time periods are sampled from the empirical playback pool to form a sample set Temp=$\{s_t, a_t, r_t, s_{t+1}\}$.

Parameter arrays to be summarized are initialized to null: Res=(0, 0, 0 . . . ), Uses=(0, 0, 0 . . . ), Va=(0, 0, 0 . . . ) and Slp=(0, 0, 0 . . . ). The sampled mapping vector groups of the previous W time periods are traversed, a currently traversed period number is recorded using a parameter t, statistical data corresponding to various VNFs are summarized, and the current traversed VNFs are recorded using parameter x. The summarizing formulas are shown in formulas (8), (9), (10) and (11):

$$Res(x) = \frac{\text{Sum}(SRs(t), VNF_x)}{\text{Sum}(SRs(t))} \times 100\%, x \le k \tag{8}$$

$$\text{Uses}(x) = \frac{\text{Sum}(G^M(t), VNF_x)}{\text{Sum}(SRs(t))} \times 100\%, x \le k \tag{9}$$

$$Va(x) = \text{Sum}(SRs(t) | VNF_x, p = 0) + \text{Sum}(SRs(t) | VNF_x, p = 1), x \le k \tag{10}$$

$$Slp(x) = \text{Sum}(SRs(t) | VNF_x, p = 0), x \le k \tag{11}$$

In the formulas, Sum(SRs(t),$VNF_x$) represents a sum of request numbers for the $x^{th}$ VNF at the time slot t from the network service function request set SRs(t), and k is the total number of VNF types; Sum(SRs(t)) represents a sum of request numbers for all the VNFs in the network service function request set SRs(t) at the time slot t; Sum($G^M$(t), $VNF_x$) represents a sum of mapping numbers of the $x^{th}$ VNF in the service mapping topology graph $G^M$(t) at the time slot t; Sum(SRs(t)|$VNF_x$, p=0) represents a sum of numbers of dormancy states of the $x^{th}$ VNF at the time slot t, and Sum(SRs(t)|$VNF_x$, p=1) represents a sum of numbers of activated states of the $x^{th}$ VNF at the time slot t.

Average values of the data are recorded by an average request rate AvgRes, an average utilization rate AvgUses, an average number AvgVa of deployed VNFs and an average number AvgSlp of unactivated VNFs, so as to design a redeployment strategy. The calculation formulas are as follows:

$$AvgRes = \frac{\sum_{x=0}^{k} Res(x)}{k} \tag{12}$$

$$AvgUses = \frac{\sum_{x=0}^{k} \text{Uses}(x)}{k} \tag{13}$$

$$AvgVa = \frac{\sum_{x=0}^{k} Va(x)}{k} \tag{14}$$

$$AvgSlp = \frac{\sum_{x=0}^{k} Slp(x)}{k} \tag{15}$$

Step V: designing a VNF redeployment strategy, and redeploying the VNFs in the basic physical network according to the data used in the step IV. Specific procedures are as follows:

TimSort merging sorting is performed on Uses according to an ascending order of the utilization rates of different VNFs in a mapping process, and TimSort can quickly complete the sorting. According to the deployment strategy of deployment after sorting, the VNFs with low utilization rate can be uninstalled first to reserve an installation space for the VNFs with high utilization rate, so as to accelerate the VNF redeployment progress. Four redeployment strategies are designed to redeploy different VNFs. For the $x^{th}$ VNFs, the four strategies are as follows: (1) uninstalling: if a request rate is less than 70% of the average request rate AvgRes, a utilization rate is less than 70% of the average utilization rate AvgUses, a number of deployed VNFs is greater than 120% of the average number AvgVa of deployed VNFs, and a number of unactivated VNFs is greater than 110% of AvgSlp, as shown in formula (16), 10% of unactivated VNFIs are uninstalled; (2) installing: if a request rate is greater than 130% of AvgRes, a utilization rate is greater than 130% of AvgUses, a number of deployed VNFs is less than 80% of AvgVa, and a number of unactivated VNFs is zero, as shown in formula (17), an incremental deployment on the VNFIs is performed, wherein the number of deployed VNFs is 10% of the existing number Va(x); (3) activating: if a request rate is greater than 110% of AvgRes, a utilization rate is greater than 110% of AvgUses, and there are unactivated VNFIs, as shown in formula (18), 10% of sleeping VNFIs are activated; and (4) sleeping: if a request rate is less than 90% of AvgRes, a utilization rate is less than 90% of AvgUses, and there are activated VNFIs, as shown in formula (19), 10% of the activated VNFIs are made sleeping.

$$\text{Res}(x) \le AvgRes \times 0.7 \text{ AND Uses}(x) \le AvgUses \times 0.7 \text{ AND Va}(x) \ge AvgVa \times 1.2 \text{ AND Slp}(x) \ge AvgSlp \times 1.1 \tag{16}$$

$$\text{Res}(x) \ge AvgRes \times 1.3 \text{ AND Uses}(x) \ge AvgUses \times 1.3 \text{ AND Va}(x) \le AvgVa \times 0.8 \text{ AND Slp}(x) == 0 \tag{17}$$

$$\text{Res}(x) \ge AvgRes \times 1.1 \text{ AND Uses}(x) \ge AvgUses \times 1.1 \text{ AND Slp}(x) \ne 0 \tag{18}$$

After mapping training and continuous redeployment and convergence of the VNFs according to the historical data, a test is performed in terms of the effective service utilization rate and the mapping rate.

The influence of ratio weights of two indexes, i.e., the effective service cost rate and the mapping rate, on optimization effects of the method disclosed herein is considered in a design experiment. There are totally three groups of experimental environments: (1) weight $\alpha_1=0.3$, $\alpha_2=0.7$; (2) $\alpha_1=0.5$, $\alpha_2=0.5$; (3) $\alpha_1=0.7$, $\alpha_2=0.3$, and the average effective service cost rate and the average mapping rate are taken as investigation targets. The weights $\alpha_1$ and $\alpha_2$ respectively represent the influence of the effective service cost rate and the mapping rate on the final optimization result, and a comparison experiment with the DDPG method and the DQN method is conducted. Results of the three methods in three experimental environments within 500 time periods are selected, and the test results are as shown in FIGS. 3A-4C. As can be seen from FIGS. 3A-3C, as the effective service cost rate weight $\alpha_1$ increases, the converged average effective service cost rate gradually increases. Compared with DDPG and DQN, the ISM-DRL method disclosed herein enhances the effect most significantly. The maximum 67% at the weight $\alpha_1=0.3$ is increased to 84% at the weight $\alpha_1=0.7$, which is increased by about 17%. The method has higher effective cost utilization efficiency. As can be seen from FIGS. 4A-4C, as the evaluated mapping ratio weight $\alpha_2$ decreases, the decrease of the ISM-DRL method provided by the weight after convergence is minimum. As the 75% at $\alpha_2=0.7$ is decreased to the 50% at $\alpha_2=0.3$, the method demonstrates better resistance to mapping interference.

In the present invention, the problem of mapping of service function chains is decomposed into SFCR mapping and VNF redeployment. The improved DDPG is used as an SFCR mapping learning framework. Improving the effective service cost rate and the average mapping rate is taken as an optimization target to approximately solve an optimal mapping strategy of a current network. The historical mapping data is acquired from the empirical playback pool. The request rates and the utilization rates of different VNFs, the number of deployed VNFs and the number of unactivated VNFs are calculated according to the historical mapping data. Four redeployment strategies are designed to redeploy the VNFs on the basic physical network. Therefore, the self adaptivity of the VNFs to service requests is improved, thus increasing the effective service cost rate and the mapping rate. Furthermore, the effective service cost rate is a ratio of the mapping cost actually used in the mapping process to the total cost.

The above mentioned contents are only preferred embodiments of the present invention and are not intended to limit the present invention. Any modification, equivalent substitution, improvement, etc., made within the spirit and principle of the present invention shall all fall within the scope of protection of the present invention.

The invention claimed is:

1. A method for a self-adaptive service function chain (SFC) mapping based on a deep reinforcement learning, comprising:

step I: establishing a SFC mapping model, dividing an SFC mapping process into a three-layer structure comprising a network function service request set, a request mapping layer, and a basic physical network, and representing the three-layer structure with abstract parameters;

step II: building a service function chain request (SFCR) mapping learning neural network, initializing parameters of the SFCR mapping learning neural network, and mapping the abstract parameters in the step I to a state, an action, and a reward value involved in the SFCR mapping learning neural network;

step III: establishing an empirical playback pool and updating network parameters of the SFCR mapping learning neural network;

step IV: determining whether a current time slot t meets a redeployment requirement, and if not, returning to the step III, or otherwise, proceeding to step V;

step V: summarizing request rates and utilization rates of different virtual network functions (VNFs), a number of currently deployed VNFs, and a number of unactivated VNFs based on historical SFCR mapping data stored in the empirical playback pool;

and step VI: designing a VNF redeployment strategy, and redeploying the VNFs in the basic physical network according to data summarized in the step V;

in the step II, the initializing of the parameters of the SFCR mapping learning neural network comprises: initializing a mapping learning framework by setting the mapping topology graph $G^M$ to null, initializing the empirical playback pool to null, randomly initializing a current strategy network parameter $\theta^\mu$ and a current value network parameter $\theta^Q$, and respectively copying the current strategy network parameter and the current value network parameter to a target strategy network parameter $\theta^{\mu'}$ and a target value network parameter $\theta^{Q'}$;

an implementation method of the step III comprises: storing an acquired state $s_t$, an action $a_t$, a reward value $r_t$ and a next state $s_{t+1}$ into the empirical playback pool in a form of a quad $<s_t, a_t, r_t, s_{t+1}>$; updating network parameters by putting a current state $s_i$ and a current action $a_i$ into a current value network to obtain $Q_i=Q(s_i, \mu(s_i|\theta^\mu)|\theta^Q)$, wherein $\theta^\mu$ is a current strategy network parameter, $\theta^Q$ is a current value network parameter, and Q( ) represents an action value function; randomly sampling W time period vectors from the empirical playback pool, and sending the time period vectors into a target value network for training to obtain a target value $Q'_{i+1}=Q(s_{i+1}, \mu'(s_i|\theta^{\mu'})|\theta^{Q'})$, wherein $\theta^\mu$ is a target strategy network parameter, and $\theta^{Q'}$ is a target value network parameter; calculating a target return $y_i=r_i+\gamma Q'_{i+1}$; finally, updating the current strategy network parameter $\theta^\mu$ and the current value network parameter $\theta^Q$ through the target return and a variance $Loss=1/N\times \Sigma_i (y_{i-i})^2$ of an actual value $Q_i$; and updating the target strategy network parameter $\theta^{\mu'}$ and the target value network parameter $\theta^{Q'}$ of a target strategy network A' and the target value network Q' by setting a soft update coefficient $\tau$ and using a soft update algorithm: $\theta'=\tau\theta'+(1-\tau)\theta'$;

wherein the step V comprises summarizing SFCR mapping vectors sampled from the empirical playback pool in previous W time periods to obtain a quad $\{s_t, a_t, r_t, s_{t+1}\}$, wherein $s_t$, $s_{t+1}$ respectively represent states at the current time slot t and the time slot t+1; $a_t$ is the action, and $r_t$ is the reward value;

initializing parameter arrays to be summarized to null: Res=(0, 0, 0 . . . ), Uses=(0, 0, 0 . . . ), Va=(0, 0, 0 . . . ), and Slp=(0, 0, 0 . . . );

traversing sampled mapping vector groups of the previous W time periods, recording a currently traversed period number using a parameter t, summarizing statistical data corresponding to various VNFs, recording current traversed VNFs using a parameter x, thus obtaining the request rates:

$$Res(x) = \frac{\mathrm{Sum}(SRs(t),\ VNF_x)}{\mathrm{Sum}(SRs(t))} \times 100\%,\ x \le k;$$

the utilization rates are:

$$\text{Uses}(x) = \frac{\text{Sum}(G^M(t),\ VNF_x)}{\text{Sum}(SRs(t))} \times 100\%,\ x \le k;$$

the number of the currently deployed VNFs is: $Va(x)=Sum(SRs(t)|VAF_x, p=0)+Sum(SRs(t)|VAF_x, p=1)$, $x \le k$;

the number of the unactivated VNFs is: $Slp(x)=Sum(SRs(t)|VNF, p=0)$, $x \le k$;

wherein, $Sum(SRs(t), VNF_x)$ represents a sum of request numbers for the $x^{th}$ VNF at the current time slot t from the network service function request set SRs(t), and k is the total number of VNF types; Sum(SRs(t)) represents a sum of request numbers for all the VNFs in the network service function request set SRs(t) at the current time slot t; $Sum(G^M(t), VNF_x)$ represents a sum of mapping numbers of the $x^{th}$ VNF in a service mapping topology graph $G^M(t)$ at the current time slot t; $Sum(SRs(t)|VNF_x, p=0)$ represents a sum of numbers of dormancy states of the $x^{th}$ VNF at the current time slot t, and $Sum(SRs(t)|VNF_x, p=1)$ represents a sum of numbers of activated states of the $x^{th}$ VNF at the current time slot t;

an average of the request rates is an average request rate $$AvgRes = \frac{\sum_{x=0}^{k} Res(x)}{k};$$

an average of the utilization rates is an average utilization rate $$AvgUses = \frac{\sum_{x=0}^{k} \text{Uses}(x)}{k};$$

an average of numbers of the currently deployed VNFs is an average number of deployed VNF; and $$AvgVa = \frac{\sum_{x=0}^{k} Va(x)}{k}$$

an average of numbers of the unactivated VNFs is an average number $$AvgSlp = \frac{\sum_{x=0}^{k} Slp(x)}{k}$$

of the unactivated VNFs.

2. The method for the self-adaptive service function chain mapping based on the deep reinforcement learning according to claim 1, wherein in the step I, the representing of the three-layer structure with the abstract parameters comprises:

abstracting the network function service request set into a set $SRs=\{SCFR_1, SCFR_2, SCFR_3 \ldots\}$, wherein $SCFR_1$, $SCFR_2$, and $SCFR_3$ respectively represent first, the second, and the third SFCRs in the set SRs; and representing a $f^{th}$ service function chain request $SFCR_f$ with a directed weighted graph $SR^f=(V^f, E^f, d^f)$, wherein a virtual network function node set is $V^f=\{v_1^f, v_2^f \ldots v_l^f\}$, $v_1^f$ represents a source node of the directed weighted graph $SR^f$, $v_l^f$ represents a destination node of the directed weighted graph $SR^f$, l represents a number of network functions required by the f th service function chain request $SFCR_f$, and $v_2^f \ldots V_{l-1}^f$ are middle virtual network function nodes; virtual links $e_{i,j}^f$ between an $i^{th}$ virtual network function node $v_i^f$ and a $j^{th}$ virtual network function node $v_j^f$ consist of a virtual link set $E^f=\{e_{i,j}^f | i,j \le 1\}$; $d^f$ represents that the time of a service node resource and a bandwidth resource occupied by the $f^{th}$ service function chain request $SFCR_f$ is d; a central processing unit (CPU) resource required by normal running of the $i^{th}$ virtual network function node $v_i^f$ is $vC(v_i^f)$, an internal memory resource demand is $vM(v_i^f)$, and a bandwidth resource required by each virtual link $e_{i,j}^f$ is $vB(e_{i,j}^f)$;

abstracting the basic physical network into a weighted undirected graph G={N, L} representation, wherein $N=\{n_1, n_2 \ldots n_m\}$ represents a set of physical service nodes $n_1, n_2 \ldots n_m$, m is a total number of the physical service nodes, $L=\{l_{a,b} | a,b \le m\}$ is a physical link set, and $l_{a,b}$ represents physical links between two physical service nodes $n_a$ and $n_b$; various virtual network function instances (VNFIs) is allowed to be deployed on each physical service node, and a VNFI set of the physical service nodes $n_a$ is denoted by $VNFIs^a=\{VNF_s, p|p=0,1\}$; p=0 indicates that an $x^{th}$ VNF is not activated, and p=1 indicates the $x^{th}$ VNF is activated; x is in a range of 0 to k, and k represents a type of a VNF; a current remaining CPU resource of the physical service node $n_a$ is C $(n_a)$, an internal memory resource is $M(n_a)$, a bandwidth resource of a physical link $l_{a,b}$ of the physical service nodes $n_a$ and $n_b$ is $B(l_{a,b})$; and abstracting the request mapping layer into an undirected graph $G^M=(V^f, N, vE)$, wherein the undirected graph $G^M$ represents a mapping topology graph of an SFCR in the basic physical network, $V^f$ is a set of virtual network function nodes of the $f^{th}$ service function chain request $SFCR_f$, N is a physical network service node set, and $vE=\{M_{v_i^f,n_j}\}$ represents a mapping link between the $i^{th}$ virtual network function node $v_i^f$ and the $j^{th}$ virtual network function node $n_j$ in the $f^{th}$ service function chain request $SFCR_f$.

3. The method for the self-adaptive service function chain mapping based on the deep reinforcement learning according to claim 2, wherein in the virtual network function node set $V^f$, an order of the middle virtual network function nodes $v_2^f \ldots v_{l-1}^f$ is an order where SFC network flows or business flows pass through the network functions.

4. The method for the self-adaptive service function chain mapping based on the deep reinforcement learning according to claim 3, wherein in the step II, the initializing of the parameters of the SFCR mapping learning neural network comprises: initializing a mapping learning framework by setting the mapping topology graph $G^M$ to null, initializing the empirical playback pool to null, randomly initializing a current strategy network parameter $\theta^\mu$ and a current value network parameter $\theta^Q$, and respectively copying the current strategy network parameter and the current value network parameter to a target strategy network parameter $\theta^{\mu'}$ and a target value network parameter $\theta^{Q'}$.

5. The method for the self-adaptive service function chain mapping based on the deep reinforcement learning according to claim 2, wherein in the step II, the initializing of the parameters of the SFCR mapping learning neural network comprises: initializing a mapping learning framework by setting the mapping topology graph $G^M$ to null, initializing the empirical playback pool to null, randomly initializing a current strategy network parameter $\theta^\mu$ and a current value network parameter $\theta^Q$, and respectively copying the current strategy network parameter and the current value network parameter to a target strategy network parameter $\theta^{\mu'}$ and a target value network parameter $\theta^{Q'}$.

6. The method for the self-adaptive service function chain mapping based on the deep reinforcement learning according to claim 1, wherein in the step II, mapping the abstract parameters to the SFCR mapping learning neural network comprises:

including a network state G(t) of a physical service node in the basic physical network and a network function service request set SRs(t) at the current time slot t in each state $s_t$={G(t),SRs(t)} in a state space S(t)={$s_1$, $s_2$ . . . $s_t$}, wherein the state $s_t$ is an input of the SFCR mapping learning neural network;

obtaining a mapping action $a_t=\rho(s_t|\theta^\mu)$ taken under each state $s_t$ according to an action strategy function to form an action space A(t)={$a_1$, $a_2$ . . . $a_t$}, wherein μ( ) represents an action selection strategy, the mapping action is $a_t$={$a_v$, $a_m$, $a_s$}, $a_v$ is a mapping action between a VNF and a physical service node, $a_m$ is a mapping between a virtual link and a physical link, and $a_s$ is a VNF activation and dormancy action;

updating the mapping topology graph $G^M \leftarrow (G^M, a_t)$ based on a state of the mapping topology graph $G^M$ and a current mapping action $a_t$, and updating the network state G(t) of the physical service node and a network service function request set SRs(t) according to the updated mapping topology graph $G^M$ to obtain a next state $s_{t+1}$; and generating an instant return $r(s_t, a_t)$ by each action, wherein reward values $r_t$ of the instant return form a reward space R(t)={$r_1$, $r_2$ . . . $r_t$}.

7. The method for the self-adaptive service function chain mapping based on the deep reinforcement learning according to claim 6, wherein the instant return is $r(s_t, a_t)=\alpha_1 Ur(t)+\alpha_2 avgM(t)$, weights $\alpha_1, \alpha_2 \in [0,1]$ and Ur(t) and avgM (t) are respectively an effective service cost rate and an average mapping rate within the current time slot t.

8. The method for the self-adaptive service function chain mapping based on the deep reinforcement learning according to claim 7, wherein the effective service cost rate is $$Ur(t) = \frac{\sum_{VNFI \in G^M, x=1} Cr(t)}{Co(t)},$$

and the average mapping rate is $$avgM(t) = \frac{\mathrm{Sum}(SRs(t) \mid G^M(t))}{\mathrm{Sum}(SRs(t))};$$

wherein a total service cost Co(t)=Cr(t)+Ca(t)+Cs(t) is a sum of a total running cost Cr(t), a total activation cost Ca(t), and a total installation cost Cs(t);

wherein the total running cost Cr(t) is $$Cr(t) = \sum_{i=1}^{m} VNFIs^i\{VNF_x^i, p \mid p=1\} \times r(VNF_x), x \le k;$$

wherein the total activation cost Ca(t) is:

$$Ca(t) = \sum_{i=1}^{m} (\{VNFIs^i(t), p \mid p=1\} - \{VNFIs^i(t-1), p \mid p=0\}) \times a(VNF_x), x \le k;$$

wherein the total installation cost Cs(t) is:

$$Cs(t) = \sum_{i=1}^{m} (\{VNFIs^i(t) \mid VNF_x\} - \{VNFIs^i(t-1) \mid VNF_x\}) \times s(VNF_x), x \le k;$$

wherein m represents a number of physical service nodes, $VNFIs^i$ represents a VNFI set on an $i^{th}$ physical service node, $VNF_x^i$ represents an $x^{th}$ VNF in the $i^{th}$ VNFI set, k represents a total number of VNF types, and $r(VNF_x)$ represents the running cost of the $x^{th}$ VNF; {$VNFIs^i$(t), p|p=1} represents a VNF in an activated state at the current time slot t, {$VNFIs^i$(t−1), p|p=0} represents a VNF that is not activated at a time slot t−1, and a ($VNF_x$) represents an activation cost of the $x^{th}$ VNF; {$VNFIs^i$(t)|$VNF_x$} represents a deployment condition of the $x^{th}$ VNF at the current time slot t, {$VNFIs^i$(t−1)|$VNF_x$} represents a deployment condition of the $x^{th}$ VNF at the time slot t−1, and $s(VNF_x)$ represents an installation cost of the $x^{th}$ VNF.

9. The method for the self-adaptive service function chain mapping based on the deep reinforcement learning according to claim 7, wherein an implementation method of the step III comprises: storing an acquired state $s_t$, an action $a_t$, a reward value $r_t$ and a next state $s_{t+1}$ into the empirical playback pool in a form of a quad <$s_t$, $a_t$, $r_t$, $s_{t+1}$>; updating network parameters by putting a current state 5, and a current action $a_i$ into a current value network to obtain $Q_i=Q(s_i, \mu(s_i|\theta^\mu)|\theta^\mu)|\theta^Q)$, wherein $\theta^\mu$ is a current strategy network parameter, $\theta^Q$ is a current value network parameter, and Q( ) represents an action value function; randomly sampling W time period vectors from the empirical playback pool, and sending the time period vectors into a target value network for training to obtain a target value $Q'_{i+1}=Q(s_i, \mu'(s_i|\theta^{\mu'})|\theta^{Q'})$, wherein $\theta^{\mu'}$ is a target strategy network parameter, and $\theta^{Q'}$ is a target value network parameter; calculating a target return $y_i=r_i+\gamma Q'_{i+1}$; finally, updating the current strategy network parameter $\theta^\mu$ and the current value network parameter $\theta^Q$ through the target return and a variance $Loss=1/N \times \Sigma_i (y_i-Q_i)^2$ of an actual value $Q_i$; and updating the target strategy network parameter $\theta^{\mu'}$ and the target value network parameter $\theta^{Q'}$ of a target strategy network A' and the target value network Q' by setting a soft update coefficient τ and using a soft update algorithm: $\theta'=\tau\theta'+(1-\tau)\theta'$.

10. The method for the self-adaptive service function chain mapping based on the deep reinforcement learning according to claim 6, wherein an implementation method of the step III comprises: storing an acquired state $s_t$, an action $a_t$, a reward value $r_t$ and a next state $s_{t+1}$ into the empirical playback pool in a form of a quad <$s_t$, $a_t$, $r_t$, $s_{t+1}$>; updating network parameters by putting a current state 5, and a current action a, into a current value network to obtain $Q_i=Q(s_i, \mu(s_i|\theta^\mu)|\theta^Q)$, wherein $\theta^\mu$ is a current strategy network parameter, $\theta^Q$ is a current value network parameter, and Q( ) represents an action value function; randomly sampling W time period vectors from the empirical playback pool, and sending the time period vectors into a target value network for training to obtain a target value $Q'_{i+1}=Q(s_{i+1}, \mu'(s_i|\theta^{\mu'})|\theta^{Q'})$, wherein $\theta^{\mu'}$ is a target strategy network parameter, and $\theta^{Q'}$ is a target value network parameter; calculating a target return $y_i=r_i+\gamma Q'_{i+1}$; finally, updating the current strategy network parameter $\theta^{\mu}$ and the current value network parameter $\theta^{Q}$ through the target return and a variance $Loss=1/N\times\Sigma_i(y_i-Q_i)^2$ of an actual value $Q_i$, and updating the target strategy network parameter $\theta^{\mu'}$ and the target value network parameter $\theta^{Q'}$ of a target strategy network A' and the target value network Q' by setting a soft update coefficient $\tau$ and using a soft update algorithm: $\theta'=\tau\theta'+(1-\tau)\theta'$.

11. The method for the self-adaptive service function chain mapping based on the deep reinforcement learning according to claim 1, wherein the VNF redeployment strategy in the step VI comprises: (1) uninstalling: if a request rate is less than 70% of the average request rate AvgRes, a utilization rate is less than 70% of the average utilization rate AvgUses, a number of the deployed VNFs is greater than 120% of the average number AvgVa of the deployed VNFs, and a number of the unactivated VNFs is greater than 110% of AvgSlp, uninstalling 10% of the unactivated VNFIs; (2) installing: if the request rate is greater than 130% of AvgRes, the utilization rate is greater than 130% of AvgUses, the number of deployed VNFs is less than 80% of AvgVa, and the number of the unactivated VNFs is zero, performing an incremental deployment on the VNFIs, wherein the number of deployed VNFs is 10% of an existing number Va(x); (3) activating: if the request rate is greater than 110% of AvgRes, the utilization rate is greater than 110% of AvgUses, and there are the unactivated VNFIs, activating 10% of sleeping VNFIs; and (4) sleeping: if the request rate is less than 90% of AvgRes, the utilization rate is less than 90% of AvgUses, and there are activated VNFIs, making 10% of the activated VNFIs sleeping.

* * * * *